United States Patent [19]

Fondren

[11] 4,444,700
[45] Apr. 24, 1984

[54] METHOD FOR MANUFACTURING REINFORCED HOSE

[75] Inventor: Bruce J. Fondren, Holland, Ohio

[73] Assignee: Champion Spark Plug Company, Toledo, Ohio

[21] Appl. No.: 426,322

[22] Filed: Sep. 29, 1982

[51] Int. Cl.³ ............................................. B29D 23/05
[52] U.S. Cl. ...................................... 264/24; 156/149; 156/393; 264/26; 264/103; 264/131; 264/135; 264/137; 264/173; 264/174; 264/249; 425/174.4; 425/174.8 E; 425/174.8 R
[58] Field of Search ...................... 264/26, 24, 25, 135, 264/137, 249, 173, 131, 103; 425/174.8 R, 174.8 E, 174.4; 156/393, 149

[56] References Cited

U.S. PATENT DOCUMENTS

| | | | |
|---|---|---|---|
| 1,190,292 | 7/1916 | Hopkins | 264/173 |
| 3,038,523 | 6/1962 | Merck et al. | 156/393 |
| 3,359,357 | 12/1967 | Bentley, Jr. et al. | 264/173 |
| 3,532,783 | 10/1970 | Pusey et al. | 264/135 |
| 3,606,632 | 9/1971 | Bunish et al. | 264/131 |
| 4,104,098 | 8/1978 | Hush et al. | 156/149 |
| 4,112,031 | 9/1978 | Gohlisch | 264/26 |
| 4,183,888 | 1/1980 | Mutzke | 264/131 |
| 4,196,464 | 4/1980 | Russell | 156/149 |
| 4,200,125 | 4/1980 | Hush et al. | 138/126 |
| 4,219,522 | 8/1980 | Oyama | 264/173 |

Primary Examiner—Jeffery R. Thurlow
Attorney, Agent, or Firm—Oliver E. Todd, Jr.

[57] ABSTRACT

An improved method for producing a reinforced hose. A tubular core is extruded and then heated in a microwave oven to at least partially cure the core. While the core is still hot, a powdered hot-melt adhesive is electrostatically coated onto the core and forms a fusion bond with the core. The coated core is cooled, a reinforcement is applied to the core, an optional outer coating is applied and then the composite is heated to finish curing of the hose and to melt the adhesive to bond the reinforcement to the core.

4 Claims, 2 Drawing Figures

METHOD FOR MANUFACTURING REINFORCED HOSE

BACKGROUND OF THE INVENTION

This invention relates to reinforced hose and more particularly to an improved method for manufacturing a reinforced hose of a type having a reinforcement braiding extending over and bonded to a rubber core and, optionally, having an outer coating bonded to the braiding.

It is common to manufacture hose from a vulcanizable elastomeric material, such as a natural or synthetic rubber. However, a hose formed simply from vulcanized rubber has limited strength and, when the hose is bent, there is a tendancy for the hose to flatten or collapse at the point of bend. In order to eliminate these difficulties, it is common to braid or wind a reinforcement about the rubber core tube. To be effective, the reinforcement must be bonded to the core tube. Normally to obtain a good bond between the reinforcement and the core tube, it has been necessary to apply the braid to the core tube prior to curing the rubber forming the core tube. In addition, it has been common to treat the reinforcement with an adhesive. An outer cover may be applied to the reinforced tube, either by coating or by extrusion and the tube then is cured to form the final hose. Extreme care must be taken during the application of the reinforcement to the uncured core tube to prevent deformation of the tube. If the reinforcement is braided directly onto the uncured tube, there may be a tendancy for the reinforcement to compress and reduce the diameter of the tube. This problem may be eliminated by braiding onto a tubular mandrel through which the core tube is passed and sliding the braiding from the mandrel onto the tube. However, this is a slow process. Care also must be taken to prevent distortion of the uncured hose during the final curing process. One method commonly used for preventing distortion of the hose during the final curing is the lead-press method which involves forming a lead sleeve about the uncured hose, curing the hose and finally removing the lead sleeve. This process also is slow and adds considerably to the cost of manufacturing the hose.

Another method for forming a reinforced hose which is disclosed in U.S. Pat. Nos. 4,104,098 and 4,200,125, involves extruding a core from vulcanizable rubber. The uncured core is passed through a microwave oven and, at the same time, the outer surface of the core contacted with cool fluid so that the core becomes substantially cured at its center and has an uncured outer surface. The cured center region of the core provides sufficient rigidity for applying the reinforcement. A liquid adhesive then is applied to the reinforced tube, any outer coating required is applied and the tube is cured. Again, the partially cured core provides sufficient rigidity to prevent distortion during the final curing. The initial formation of the core must be carefully controlled to prevent either 100% curing of the core, in which case insufficient bonding will take place between the core and the reinforcement, and to prevent insufficient curing of the core, in which case the core may become distorted during the subsequent application of the reinforcement and the final curing steps.

SUMMARY OF THE INVENTION

The present invention is directed to an improved method for manufacturing a reinforced hose which provides a stronger hose at higher production rates and lower costs than that achieved with prior art methods. Initially, a core tube is extruded from a vary polar natural or synthetic rubber material which is capable of being heated in a microwave oven. From the extruder, the core tube is passed through a microwave oven and cured to at least 50% and up to 100%, depending upon the product being formed. As the hot tube leaves the microwave oven, a hot-melt adhesive powder is electrostatically coated onto the tube. At the instant the powder adhesive is applied to the tube, the tube has a temperature above the melting temperature of the adhesive so that the adhesive melts and fusion bonds to the surface of the rubber tube. The coated tube then is cooled, for example, by passing through a water bath. By at least 50% curing the rubber tube, the tube has sufficient strength for braiding or winding a reinforcement onto the surface of the tube without collapsing or distorting the shape of the tube. A braiding is applied to the tube in contact with the solidified hot-melt adhesive. If desired, an outer coating of a polymer or thermoplastic or thermosetting synthetic resin is applied over the braiding. The tube then is heating to a temperature sufficiently high as to complete curing of the core and any coating which requires curing and to melt the hot-melt adhesive to form a strong adhesion between the reinforcement and the cured core tube. Finally, the finished tube is cooled and packaged for subsequent use.

The above described method of the present invention has several advantages over the prior art. The method allows the use of a hot-melt adhesive having a melting temperature above the cure temperature for the rubber core. By applying the adhesive directly to the core after it is at least partially cured in a microwave oven, a strong bond is formed between the adhesive and the surface of the rubber core. Such adhesives could not be used with the prior art method since they have a melting temperature above the cure temperature for the core. By at least partially curing the core prior to application of the reinforcement, the reinforcement may be applied directly to the core tube without deforming or collapsing the core tube. Furthermore, at least partially curing the core tube eliminates the need for a core mandrel or an outer lead sleeve during the final cure process to maintain the shape of the tube during final curing. These advantages lead to a considerably higher production rate and a lower production cost than that previously achieved through prior art techniques for manufacturing reinforced hose and also lead to a stronger hose due to a stronger bonding between the reinforcement and the core tube.

Accordingly, it is an object of the invention to provide and improved method for forming a reinforced hose.

Other objects and advantages of the invention will become apparent from the following detailed description, with reference being made to the accompanying drawings.

DESCRIPTION OF THE PREFERRED EMBODIMENTS

Figure 1:
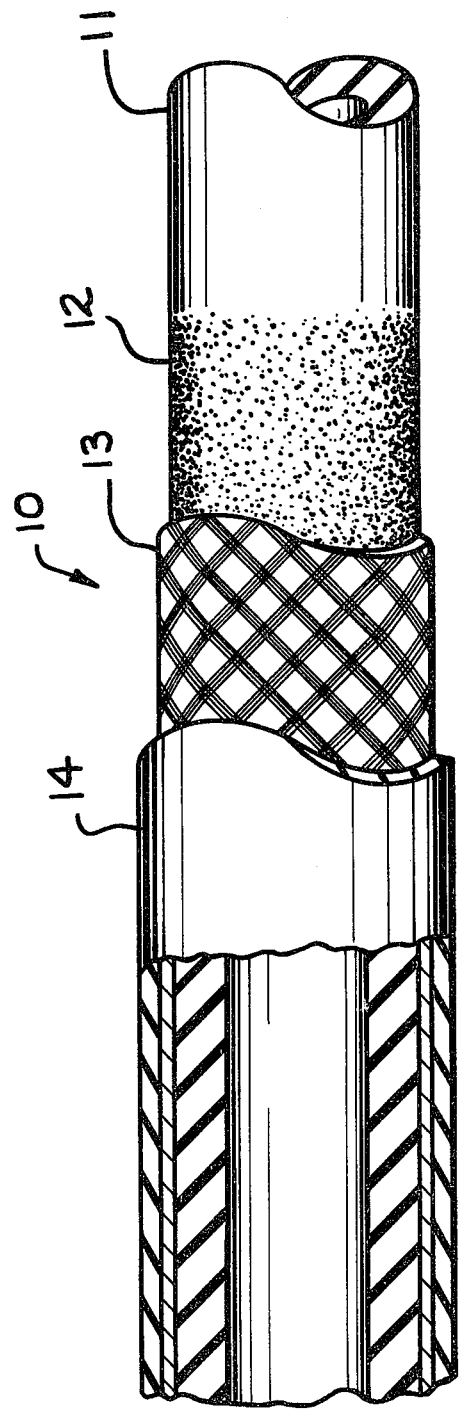
FIG. 1 is a cut-away side elevation, partially in section, of one embodiment of a hose constructed in accordance with the present invention.

Referring to FIG. 1, a cut-away and partially sectioned hose 10 constructed in accordance with the method of the present invention is shown, with the right side of the hose 10 illustrating the sequence of forming the hose 10 and the left portion showing a cross-section through the hose 10. The hose 10 is generally formed with a core tube 11 to which a hot-melt adhesive 12 is bonded. A reinforcement 13, such as a high tensile strength yarn, is woven over the tube 11 in contact with the adhesive 12 and is strongly bonded by means of the adhesive 12 to the core tube 11. Depending upon the type of hose being formed, an outer coating 14 then is applied over the reinforcement 13. The outer coating 14 provides desired physical characteristics to the finished hose 10, such as resistance to scuffing, to sun, to oil, to solvents, etc.

Figure 2:
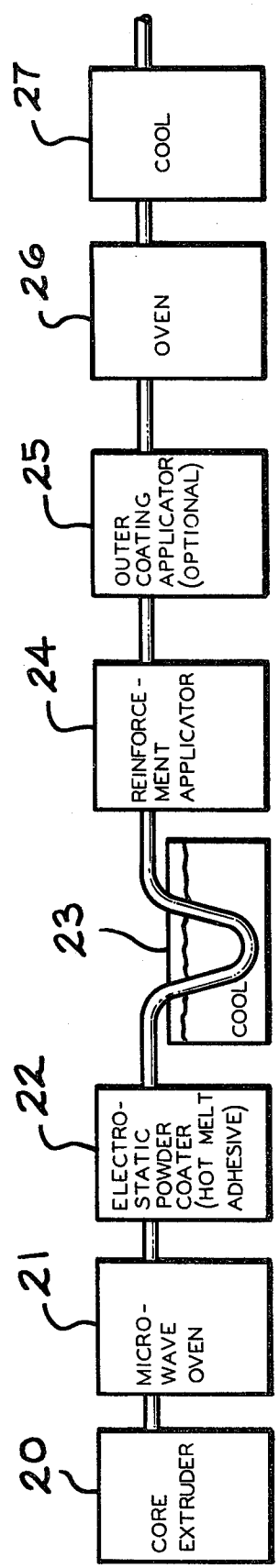
FIG. 2 is a schematic view of apparatus for carrying out the method of the present invention.

Turning now to FIG. 2, a schematic diagram is provided illustrating the method of the present invention for forming the hose 10. The core tube 11 is formed from a natural or synthetic rubber having either vary polar polymers or having carbon black added so that the rubber is capable of being heated by microwaves. Also, the rubber material has any volitale components removed and, preferrably, has a dessicant incorporated into it to soak up moisture. The rubber material is passed through an extruder 20 which heats the rubber material and forces it through a suitable die for forming the rubber core tube 11. While the extruded tube 11 is still hot, it is passed through a microwave oven 21 where it is heated, for example, to 450° F. to 500° F., to cure the rubber at least 50% and up to 100%, depending upon the product being formed. An electrostatic powder coater 22 then applies a polyester hot-melt adhesive powder to the hot tube as it leaves the microwave oven 21. The powder adhesive, which has a melting temperature on the order of 300° F., melts and bonds to the surface of the extruded tube which may still be on the order of 450° F. After the adhesive powder is coated onto the hot tube, the tube is cooled, for example, by passing through a water bath 23. A reinforcement, in the form of a winding or braid of cotton, rayon, nylon, etc., then is applied to the cooled tube at a reinforcement applicator 24. The reinforcement applicator 24 may be, for example, conventional weaving apparatus for braiding yarns on the outside of a tube. Since the core of the tube is at least 50% cured as it was passed through the microwave oven 21, the tube has sufficient strength to allow direct application of the reinforcement without risk of collapsing or distorting the shape of the tube.

After the reinforcement is applied, any desired outer coating is applied at an outer coating applicator 25. The outer coating depends upon the use to which the finished hose 10 is to be given. In some cases, such as for smaller type spray guns or air operated tools, no outer coating is applied to the braided reinforcement. In other applications, the coating applicator 25 may apply a liquid thermoplastic or thermosetting material over the braid, or an outer coating in the form of a tube may be extruded over the reinforcement. The extruded outer coating or jacket may be of various known mixtures of materials required to give desired physical characteristics. The extruded coating may be, for example, a polymer or thermoplastic or thermosetting material. After a curable polymer or a thermosetting coating is applied, the coated tube is passed through an oven 26 which may be a microwave oven or a hot fluid oven. From the oven 26, the finished tube 10 is cooled at 27, for example, by forcing cool air over the surface of the finished hose 10 or by passing the finished hose 10 through a water bath. During the final curing of the hose in the oven 26, the hot-melt adhesive is resoftened and bonds the reinforcement to the core tube 11. The resulting bond is much stronger than that achieved in the past by adhesives having a lower melting temperature. Consequently, the finished hose 10 has a higher resistance from collapsing when the hose 10 is bent through a small radius.

If a thermoplastic coating is applied to the reinforced core, the reinforced core is heated to reflux the hot-melt adhesive prior to applying the coating. Infrared heaters may be used for this purpose. While the hose remains hot, the thermoplastic coating is applied and the finished hose is rapidly cooled with chilled water. Although the thermoplastic coating, such as a vinyl coating, may be applied at above the melting temperature of the adhesive, it is applied and chilled to quickly to adequately flux the adhesive.

When no outer coating is applied to the reinforced hose, the adhesive is refluxed with hot air after the reinforcement is applied. Preferably, the braiding is of a material which shrinks slightly when heated, such as a polypropylene. Shrinkage of the braiding when the hose is heated to reflux the adhesive provides a stronger bond between the reinforcement and the core.

It will be appreciated that various changes and modifications may be made in the above described method for forming a hose without departing from the spirit and the scope of the following claims. The critical feature of the invention is that the extruded tube must be heated sufficiently in the microwave oven 21 to produce a fusion bond with the hot-melt adhesive powder as it is applied at the electrostatic powder coater 22. This results in a high bond between the core tube 11 and the braided reinforcement 13 to in turn produce a hose 10 having a better resistance against collapse when bent than prior art hoses of the same general type. The process also results in a higher production rate since a mandrel is not required for weaving the braiding. Also, production rates are higher since the at least partially precured core tube 11 eliminates the need for a lead-press or mandrel during the final curing operation.

What I claim is:

1. A method for producing a reinforced hose comprising the steps of: extruding a tube from a vulcanizable rubber capable of being heated in a microwave oven; while the tube has its extruded shape and is still warm from extrusion at least partially curing said tube by heating in a microwave oven to at least a predetermined temperature; while said tube is at such predetermined temperature, electrostatically coating said tube with a powdered hot-melt adhesive having a melting temperature less than such predetermined temperature, the thermal energy level in said tube producing a fusion bond between said tube and said coating; cooling said coated tube; applying reinforcement to said coated tube in contact with said coating; and heating said coated tube and reinforcement to at least the melting temperature of said adhesive to bond said reinforcement to said tube.

2. A method for producing a reinforced hose, as set forth in claim 1, wherein said tube is at least 50% cured in said microwave oven, and wherein any remaining curing of said tube is completed when said coated tube and reinforcement are heated.

3. A method for producing a reinforced hose, as set forth in claim 2, and further including the step of applying an outer coating to said reinforced tube prior to heating.

4. A method for producing a reinforced hose, as set forth in claim 2, and further including the step of extruding a curable outer coating over said reinforced tube prior to heating, and wherein said coating is cured when heated with said coated tube and reinforcement to at least the melting temperature of said adhesive.

* * * * *